United States Patent
Jeong et al.

(10) Patent No.: US 9,344,978 B2
(45) Date of Patent: May 17, 2016

(54) ACCESS POINT HAVING MULTICHANNEL AND MULTI TRANSMISSION POWER, CELL FORMATION METHOD

(71) Applicant: KT CORPORATION, Gyeonggi-do (KR)

(72) Inventors: Yang-Seok Jeong, Gyeonggi-do (KR); Jong-Hwa Shin, Seoul (KR); Weon-Yong Joo, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 419 days.

(21) Appl. No.: 13/668,313

(22) Filed: Nov. 4, 2012

(65) Prior Publication Data

US 2013/0136018 A1 May 30, 2013

(30) Foreign Application Priority Data

Nov. 30, 2011 (KR) .......... 10-2011-0126956

(51) Int. Cl.
| | | |
|---|---|---|
| *H04W 52/50* | (2009.01) | |
| *H04W 16/30* | (2009.01) | |
| *H04W 52/28* | (2009.01) | |

(52) U.S. Cl.
CPC .............. *H04W 52/50* (2013.01); *H04W 16/30* (2013.01); *H04W 52/283* (2013.01); *Y02B 60/50* (2013.01)

(58) Field of Classification Search
CPC . H04W 88/08; H04W 8/005; H04W 52/0206; H04W 76/04; H04W 28/18; H04W 52/04; H04W 52/283
See application file for complete search history.

(56) References Cited

U.S. PATENT DOCUMENTS

| | | |
|---|---|---|
| 6,522,881 B1 | 2/2003 | Feder et al. |
| 7,583,625 B2 | 9/2009 | Bennett |
| 7,653,386 B2 | 1/2010 | Bennett |
| 7,676,241 B2 | 3/2010 | Bennett |
| 7,720,038 B2 | 5/2010 | Bennett |
| 7,787,901 B2 | 8/2010 | Bennett |
| 7,830,845 B2 | 11/2010 | Bennett |
| 7,864,742 B2 | 1/2011 | Bennett |
| 7,894,846 B2 | 2/2011 | Bennett |
| 8,112,074 B2 | 2/2012 | Bennett |
| 8,161,302 B2 | 4/2012 | Woo |
| 8,169,989 B2 | 5/2012 | Bennett |
| 8,170,546 B2 | 5/2012 | Bennett |
| 2002/0080024 A1 | 6/2002 | Nelson, Jr. et al. |
| 2003/0171116 A1* | 9/2003 | Soomro .................. 455/434 |
| 2004/0137908 A1 | 7/2004 | Sinivaara et al. |
| 2004/0202141 A1 | 10/2004 | Sinivaara et al. |
| 2004/0266493 A1* | 12/2004 | Bahl et al. .................. 455/574 |

(Continued)

FOREIGN PATENT DOCUMENTS

| | | |
|---|---|---|
| KR | 10-2005-0101070 A | 10/2005 |
| KR | 10-0700085 B1 | 3/2007 |

(Continued)

*Primary Examiner* — Curtis A Alia
(74) *Attorney, Agent, or Firm* — IP Legal Services, LLC

(57) ABSTRACT

Described embodiments provide an access point for forming multiple service zones within a corresponding cell. The access point may include a first access point module and a second access point module. The first access point module may be configured to form a first service zone for first user equipment located at a center area of the cell. The second access point module may be configured to form a second service zone for second user equipment located at an edge area of the cell.

17 Claims, 6 Drawing Sheets

(56) References Cited

U.S. PATENT DOCUMENTS

| | | |
|---|---|---|
| 2005/0226183 A1 | 10/2005 | Penumetsa |
| 2005/0250528 A1 | 11/2005 | Song et al. |
| 2007/0248033 A1 | 10/2007 | Bejerano et al. |
| 2008/0056177 A1* | 3/2008 | Mori et al. .................. 370/318 |
| 2008/0056201 A1 | 3/2008 | Bennett |
| 2008/0080388 A1 | 4/2008 | Dean et al. |
| 2008/0102852 A1 | 5/2008 | Du et al. |
| 2009/0116448 A1 | 5/2009 | Nam et al. |
| 2009/0197603 A1 | 8/2009 | Ji et al. |
| 2010/0091669 A1 | 4/2010 | Liu et al. |
| 2010/0124204 A1 | 5/2010 | Won |
| 2010/0157835 A1 | 6/2010 | Zhang et al. |
| 2010/0177756 A1 | 7/2010 | Choi et al. |
| 2010/0303051 A1* | 12/2010 | Umeuchi et al. ............. 370/338 |
| 2011/0013533 A1 | 1/2011 | Bennett |
| 2011/0013608 A1 | 1/2011 | Lee et al. |
| 2011/0110282 A1 | 5/2011 | Wu et al. |
| 2011/0216692 A1 | 9/2011 | Lundsgaard et al. |
| 2011/0222421 A1 | 9/2011 | Jana et al. |
| 2011/0299422 A1 | 12/2011 | Kim et al. |
| 2012/0063337 A1* | 3/2012 | Shukla ....................... 370/252 |
| 2012/0155350 A1 | 6/2012 | Wentink et al. |
| 2012/0287859 A1 | 11/2012 | Ji et al. |
| 2013/0003679 A1 | 1/2013 | Seok et al. |
| 2014/0003254 A1 | 1/2014 | Andreoli-Fang et al. |
| 2014/0092731 A1 | 4/2014 | Gupta |

FOREIGN PATENT DOCUMENTS

| | | |
|---|---|---|
| KR | 10-2009-0006100 A | 1/2009 |
| KR | 10-2009-0011260 A | 2/2009 |
| KR | 10-2009-0013180 A | 2/2009 |
| KR | 10-0948506 B1 | 3/2010 |
| KR | 10-2010-0056624 A | 5/2010 |
| KR | 10-2010-0080740 A | 7/2010 |
| KR | 10-2010-0083703 A | 7/2010 |
| KR | 10-2010-0114109 A | 10/2010 |
| KR | 10-2011-0006906 A | 1/2011 |
| KR | 10-2011-0027042 A | 3/2011 |
| KR | 10-2011-0065996 A | 6/2011 |
| KR | 10-1039617 B1 | 6/2011 |
| KR | 10-2011-0089802 A | 8/2011 |
| KR | 10-2013-0093662 A | 8/2013 |
| WO | 2004/064439 A1 | 7/2004 |
| WO | 2012/068349 A1 | 5/2012 |

* cited by examiner

ACCESS POINT HAVING MULTICHANNEL AND MULTI TRANSMISSION POWER, CELL FORMATION METHOD

CROSS REFERENCE TO PRIOR APPLICATIONS

The present application claims priority under 35 U.S.C. §119 to Korean Patent Application No. 10-2011-0126956 (filed on Nov. 30, 2011), which is hereby incorporated by reference in its entirety.

The subject meter of this application is related to U.S. patent application Ser. No. 13/668,310 filed Nov. 4, 2012, the teachings of which are incorporated herein in their entirety by reference.

FIELD OF THE INVENTION

The present invention relates to communications and, in particular, to an access point providing a wireless local area network (LAN) service.

BACKGROUND OF THE INVENTION

A wireless local area network (WLAN) may include at least one access point and user equipment. Such access point may form a cell, also referred to as a service area. User equipment finds access points in a related area through a scanning process and establishes connection to one of the access points. User equipment may communicate with other parties through the established connection to the access point. User equipment may have various wireless environments according to the position in the cell and dynamically control a data transmit rate according to a wireless channel condition.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments of the present invention overcome the above disadvantages and other disadvantages not described above. Also, the present invention is not required to overcome the disadvantages described above, and an embodiment of the present invention may not overcome any of the problems described above.

In accordance with an aspect of the present invention, an access point may form two separate service zones, one for user equipment located at a cell center area and the other for user equipment located at a cell edge area by controlling transmission power of a signal transmitted to user equipment.

In accordance with another aspect of the present invention, an access point may transmit a signal to user equipment located at a center area of a cell with comparatively low transmission power and transmit a signal to user equipment located at an edge area of a cell with comparatively high transmission power.

In accordance with still another aspect of the present invention, an access point may include at least two access modules, one for user equipment operating at a comparatively high data transmit rate and the other for user equipment operating at a comparatively low data transmit rate.

In accordance with at least one embodiment of the present invention, an access point may be provided for forming multiple service zones within a corresponding cell. The access point may include a first access point module and a second access point module. The first access point module may be configured to form a first service zone for first user equipment located at a center area of the cell. The second access point module may be configured to form a second service zone for second user equipment located at an edge area of the cell.

The first access point module may be configured to set a first transmission power for signals transmitted to the first user equipment in order to form the first service zone. The second access point module may be configured to set a second transmission power for signals transmitted to the second user equipment in order to form the second service zone. The first transmission power may be lower than the second transmission power.

The first access point module may be configured to transmit a probe response signal only to user equipment located in the first service zone in response to a probe request signal from the user equipment. The first access point module may be configured to transmit a probe response signal only to user equipment that transmits a probe request signal having signal strength higher than a predetermined threshold.

The first access point module may be configured to set a third transmission power for transmitting a data frame and a control frame to the first user equipment and to set a fourth transmission power for transmitting a management frame to the first user equipment. The fourth transmission power may be lower than the third transmission power.

The access point may further include a data transmit rate measurement unit and a connection control unit. The data transmit rate measurement unit may be configured to measure a data transmit rate of at least one of the first and second user equipment and to compare the measured data transmit rate with a reference data transmit rate. The connection control unit may be configured to switch connection of the first user equipment from the first access point module to the second access point module when the measured data transmit rate of the first user equipment is slower than the reference data transmit rate, and to switch connection of the second user equipment from the second access point module to the first access point module when the measured data transmit rate of the second user equipment is faster than the reference data transmit rate.

In accordance with at least one embodiment of the present invention, an access point may include a first access point module and a second access point module. The first access point module may be configured to provide connection to first user equipment located in around a center area of an associated cell. The second access point module may be configured to provide connection to second user equipment locate in around an edge area of the associated cell.

The first access point module may be configured to set a signal transmission power to be comparatively low for transmitting a signal to the first user equipment. The second access point module may be configured to set the signal transmission power to be comparatively high for transmitting a signal to the second user equipment.

The access point may further include a first probe response control unit and a second probe response control unit. The first probe response control unit may be configured to control the first access point module to transmit a probe response signal when an associated probe request signal has signal strength is higher than a probe response threshold. The second probe response control unit may be configured to control the second access point module to transmit a probe response signal when an associated probe request signal has signal strength is lower than a probe response threshold.

The access point may further include a data transmit rate measurement unit and a connection control unit. The data transmit rate measurement unit may be configured to measure a data transmit rate of user equipment. The connection control unit may be configured to switch connection of the user equipment between the first access point module and the second access point module according to the measured data transmit rate of the user equipment.

The connection control unit may be configured to switch connection of the first user equipment from the first access point module to the second access point module when the measured data transmit rate is slower than a reference data transmit rate. Furthermore, the connection control unit may be configured to switch connection of the second user equipment from the second access point module to the first access point module when the measured data transmit rate is faster than the reference data transmit rate. The connection control unit may be configured to transmit a channel switch announcement frame to least one of the first and second user equipment in order to switch the connection.

In accordance with at least one embodiment of the present invention, an access point may be provided for providing a wireless local area network (WLAN) service. The access point may include a first access point and a second access point. The first access point may be configured to transmit a signal of a first wireless channel with a first transmission power. The second access point may be configured to transmit a signal of a second wireless channel with a second transmission power lower than the first transmission power.

The first access point module may be configured to receive a probe request signal from first user equipment and transmit a probe response signal to the first user equipment only when signal strength of the received probe request signal is lower than predetermined reference signal strength. The second access point module may be configured to receive a probe request signal from second user equipment and transmit a probe response signal to the second user equipment only when signal strength of the received probe request signal is higher than the predetermined reference signal strength.

The second access point module may be configured to transmit a management frame with the second transmission power and to transmit a data/control frame with a third transmission power that is higher than the second transmission power. The third transmission power may be lower than the second transmission power and may be about identical to the first transmission power.

The first access point module may be configured to transmit a channel switch announcement frame for switching connection of the first user equipment to the second access module when a data transmit rate of the first user equipment is faster than a reference data transmit rate. The second access point module may be configured to transmit a channel switch announcement frame for switching connection of the second user equipment to the first access module when a data transmit rate of the second user equipment is slower than a reference data transmit rate.

BRIEF DESCRIPTION OF THE DRAWINGS

The above and/or other aspects of the present invention will become apparent and more readily appreciated from the following description of embodiments, taken in conjunction with the accompanying drawings, of which.

DETAILED DESCRIPTION OF THE INVENTION

Figure 1:
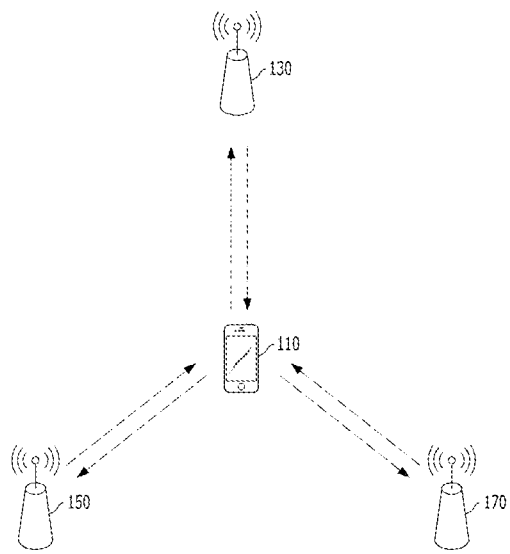
FIG. 1 shows user equipment adjacent to multiple access points in a wireless local area network (WLAN) in accordance with an embodiment of the present invention.

Reference will now be made in detail to embodiments of the present invention, examples of which are illustrated in the accompanying drawings, wherein like reference numerals refer to like elements throughout. The embodiments are described below, in order to explain the present invention by referring to the figures.

FIG. 1 shows user equipment adjacent to multiple access points in a wireless local area network (WLAN) in accordance with an embodiment of the present invention.

Referring to FIG. 1, a WLAN may include user equipment 110 and multiple access points 130, 150, and 170. When user equipment 110 is located adjacent to multiple access points 130, 150, and 170, user equipment 110 may select one of access points 130, 150, and 170 to be coupled for having a service such as an Internet service. For example, user equipment 110 may broadcast a probe request message for scanning access points in a corresponding area. Access points 130, 150, and 170 may receive the broadcasted probe request message and each transmits a probe response message to user equipment 110 in response to the probe request message.

That is, user equipment 110 may receive multiple probe response messages from access points 130, 150, and 170. Upon the receipt of the probe response messages, user equipment 110 may identify access points 130, 150, and 170 and select one of access points 130, 150, and 170. For example, user equipment 110 may select one associated with the probe response message having comparatively high signal strength among access points 130, 150, and 170 because the signal strength may be in proportion to a distance and a signal quality.

When user equipment 110 selects access point 130, user equipment 110 may exchange an authentication request message and an authentication response message with access point 130 for an authentication procedure. Furthermore, user equipment 110 may exchange an association request message and an association response message with access point 130 for establishing connection to access point 130. After establishing the connection, user equipment 110 may receive an Internet service through access point 130 and/or communicate with other parties through access point 130.

Figure 2:
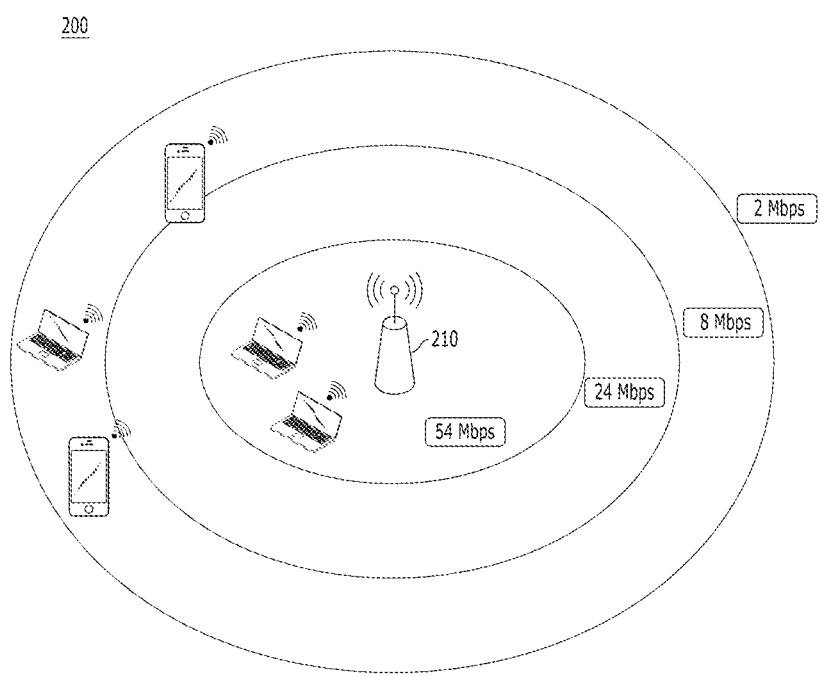
FIG. 2 shows a cell formed by an access point in a WLAN in accordance with at least one embodiment of the present invention.

FIG. 2 shows a cell formed by an access point in a WLAN in accordance with at least one embodiment of the present invention.

Referring to FIG. 2, access point 210 may form cell 200, also referred to as a service area. Access point 210 may provide a channel to a plurality of user equipment located within cell 200. User equipment may communicate with other parties and have an Internet service using the provided channel. Since communication environment in cell 200 may be dynamically changed according to a location of user equipment, access point 210 may adaptively control a data transmit rate of user equipment according to a wireless channel status. For example, user equipment located in a comparatively short distance from access point 210 may operate at a comparatively high data transmit rate such as about 54 Mbps. User equipment located in a comparatively long distance from access point 210 may operate at a comparatively low data transmit rate such as about 8 Mbps. User equipment located at an edge area of cell 200 may operate at an even lower data transmit rate such as 2 Mbps. This change in rate occurs because a wireless channel status may degrade in proportion to a distance between user equipment and access point 210. For example, a signal to noise ratio and/or a signal to interference ratio may worsen as user equipment becomes more distant from access point 210. Accordingly, multiple user devices operate at different data transmit rates although the multiple devices are located in the same cell.

In such cell 200, WLAN devices, such as a plurality of user equipment and access point 210, may communicate with each other according to a medium access control (MAC) protocol defined in an IEEE 802.11 standard. According to the MAC protocol, a WLAN device supports a distributed coordinate function (DCF) and a point coordinate function (PCF). The DCF is a mandatory function and a free competition type function. The PCF is an optional function and a centralized control type function. The PCF may allow an access point to act as a network coordinator to manage channel access. Most of WLAN devices support the DCF rather than the PCF because the DCF is a mandatory function.

According to a DCF protocol, a WLAN device such as user equipment determines whether a wireless channel is already occupied by another WLAN device and estimates a channel occupancy time in advance. In order to perform such operation, WLAN devices may share a network allocation vector (NAV). The NAV may be a virtual channel occupancy timer. When a WLAN device determines that a wireless channel is not occupied, the WLAN device may compete with others to occupy the wireless channel. A first WLAN device accessing the wireless channel may occupy the wireless channel according to the DCF protocol. After acquiring the wireless channel, the WLAN device may set the NAV with a channel occupancy time estimated for transmitting desired data. Neighbor WLAN devices should wait until the NAV is expired.

As described, after acquiring a wireless channel, a WLAN device may occupy the acquired wireless channel as long as the WLAN device wants. Accordingly, all WLAN devices cannot fairly share a wireless channel. For transmitting the same amount of data, user equipment operating at a comparatively low data transmit rate such as about 8 Mbps may occupy a wireless channel longer than user equipment operating at a comparatively high data transmit rate such as about 54 Mbps. Hereinafter, user equipment operating at a comparatively low data transmit rate may be referred to as low speed user equipment and user equipment operating at a comparatively high data transmit rate may be referred to as high speed user equipment. When a large number of low speed user equipment is located in a cell, high speed user equipment may have comparatively less opportunity to occupy a wireless channel because low speed user equipment occupies a wireless channel comparatively long time.

In accordance with at least one embodiment of the present invention, an access point may classify user equipment into high speed user equipment and low speed user equipment and manage the high speed user equipment and the low speed user equipment separately by dynamically controlling transmission powers of signals. Hereinafter, such access point will be described with reference to FIG. 3

Figure 3:
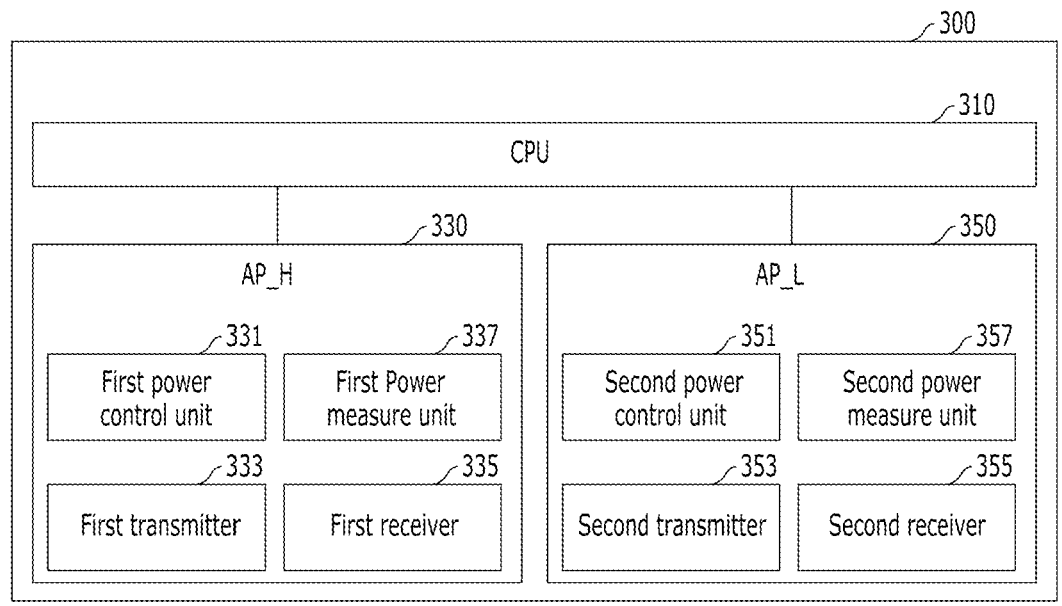
FIG. 3 shows an access point in accordance with at least one embodiment of the present invention.
Figure 4:
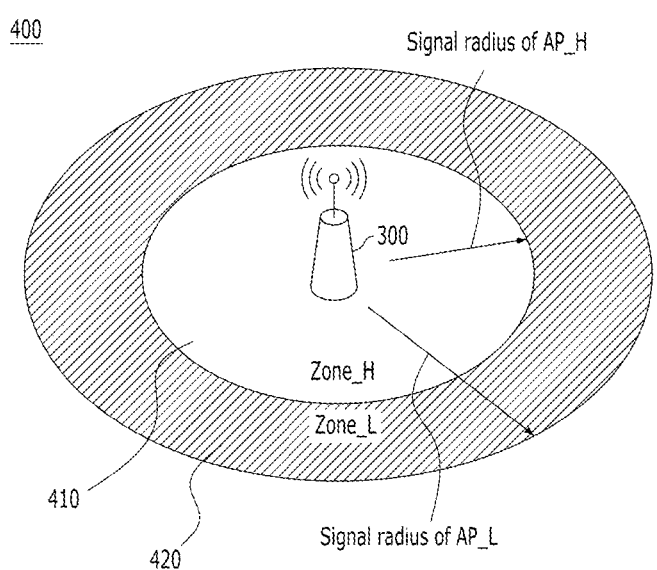
FIG. 4 shows transmission power control in an access point in accordance with at least one embodiment of the present invention.

FIG. 3 shows an access point in accordance with at least one embodiment of the present invention. FIG. 4 shows transmission power control in an access point in accordance with at least one embodiment of the present invention.

Referring to FIG. 3, access point 300 may include central processing unit (CPU) 310, low power access point module (AP_H) 330, and high power access point module (AP_L) 350 in accordance with at least one embodiment of the present invention. Low power access point module (AP_H) 330 may be an access point module for managing high speed user equipment. For example, AP_H 330 may provide connection to high speed user equipment. As described, the high speed user equipment may denote user equipment operating at a comparatively high data transmit rate. Low power access point 330 may be referred to as high speed user equipment access point. High power access point module (AP_L) 350 may be an access point module for managing low speed user equipment. For example, AP_L 350 may provide connection to low speed user equipment. As described, the low speed user equipment may denote user equipment operating at a comparatively low data transmit rate. High power access point module (AP_L) 350 may be referred to as a low speed user equipment access point.

CPU 310 may control overall operation of constituent elements in access point 300. Particularly, CPU 310 may control AP_H 330 and AP_L 350 in accordance with at least one embodiment of the present invention.

AP_H 330 and AP_L 350 may form two separate service zones for high speed user equipment and low speed user equipment by dynamically controlling transmission power of signals to be transmitted to high speed user equipment and low speed user equipment. Furthermore, AP_H 330 and AP_L 350 may use different wireless channels for communication with user equipment in a cell governed by access point 300. Since access point 300 uses at least two different wireless channels, user equipment may recognize access point 300 as two different access points.

Particularly, AP_H 330 may set a signal transmission power to be comparatively low for transmitting a signal to high speed user equipment. For example, AP_H 330 may set a signal transmission power lower than that of AP_L 350 in accordance with at least one embodiment of the present invention. Due to the comparatively low transmission power, AP_H 330 may form service zone (Zone_H) 410 at a center of cell 400, as shown in FIG. 4.

AP_L 350 may set a signal transmission power to be comparatively high for transmitting a signal to low speed user equipment. For example, AP_L 350 may set a signal transmission power higher than that of AP_H 330 in accordance with at least one embodiment of the present invention. Due to the comparatively high transmitter power, AP_L 350 may form service zone (Zone_L) 420 at mainly edges area of cell 400.

As a result of the transmission power control through AP_H 330 and AP_L 350, AP_H 330 may form service zone (Zone_H) 410 narrower than service zone (Zone_L) 420 formed by AP_L 350, as shown in FIG. 4. Such service zone (Zone_H) 410 may be referred to as a high speed service zone or a low power service zone. Service zone (Zone_L) 420 may be referred to as a low speed service zone or a high power service zone.

In order to control the transmission power, AP_H 330 may include first power control unit 331, first power measure unit 337, first transmitter 333, and first receiver 335.

First transmitter 333 may transmit signals to high speed user equipment, which may be located at high speed service zone 410 of cell 400. For example, first transmitter 333 may transmit signals with a transmission power controlled by first power control unit 333. Particularly, first transmitter 333 may transmit signals with comparatively low transmission power.

First power control unit 331 may control transmission power of signals for high speed user equipment, which are transmitted through first transmitter 333. Particularly, first power control unit 331 may set transmission power lower than that of second power control unit 351 of AP_L 350.

In order to control the transmission power, AP_L 350 may include second power control unit 351, second power measure unit 357, second transmitter 353, and second receiver 355.

Second transmitter 353 may transmit signals to low speed user equipment, which may be located at low speed service zone 420 of cell 400. For example, second transmitter 353 may transmit signals with a transmission power controlled by second power control unit 351. Particularly, second transmitter 353 may transmit signals with comparatively high transmission power.

Second power control unit 351 may set transmission power of signals for low speed user equipment, which are transmitted through second transmitter 353. Particularly, second power control unit 351 may set transmission power higher than that of first power control unit 331 of AP_H 330.

By the transmission power control in first and second power control units 331 and 351, access point 300 may form high speed service zone (Zone_H) 410 smaller than low speed service zone (Zone_L) 420, as shown in FIG. 4. Particularly, a signal radius of AP_H 330 is shorter than that of AP_L 350. Accordingly, user equipment located at low speed service zone (Zone_L) 420 may not find AP_H 330 or may find AP_H 330 but with a weak signal when the user equipment performs a scanning process. The transmission power control in first and second control units 331 and 335 may guide user equipment in low speed service zone (Zone_L) 420 to access AP_L 350.

When user equipment is located in high speed service zone (Zone_H) 410, user equipment may be coupled to AP_H 330 and transmit and receive data at a comparatively high data transmit rate. When such user equipment may enter into low speed service zone (Zone_L) 420, the user equipment may be disconnected from AP_H 330 due to the weak transmission power of AP_H 330 in low speed service zone (Zone_L) 420. Accordingly, the user equipment may be disconnected from AP_H 330 and reconnected to AP_L 350 without interruption when the user equipment enters into low speed service zone (Zone_L) from high speed service zone (Zone_H) in accordance with at least one embodiment of the present invention. For example, such operation may be referred as a roaming process. The roaming process may hand-off the user equipment from AP_H 330 to AP_L 350, seamlessly.

Such roaming process may be required to be initiated before user equipment enters into low speed service zone (Zone_L) 420 from high speed service zone (Zone_H) 420. In order to initiate the roaming process before entering into low speed service zone 420, transmission power of AP_H 330 must be lower than that of AP_L 350 at an edge area of high speed service zone (Zone_H) 410 and the difference between the transmission powers of AP_H 330 and AP_L 350 at the edge area of high speed service zone (Zone_H) 410 must be higher than a roaming threshold of user equipment. The roaming threshold may be a condition to initiate roaming from one access point to the other when user equipment detects new access point having signal strength higher than that of a current serving access point. Since a difference between transmission power of AP_H 330 and transmission power of AP_L 350 is higher than the roaming threshold at an edge area of high speed service zone (Zone_H), user equipment entering into low speed service zone (Zone_L) may roam from AP_H 330 to AP_L 350.

In order to perform such roaming process, first power control unit 331 of AP_H 330 may set up transmission power of a signal transmitted from transmitter 333 to be lower than that of a signal transmitted from transmitter 353 of AP_L 350 and to make a difference between the signal strengths of the signals at an edge area of high power zone (Zone_H) 410 to be higher than the roaming threshold value. Furthermore, second power control unit 351 may set up transmission power of a signal transmitted from transmitter 353 to be higher than that of signal transmitted from transmitter 333 of AP_H 330 and to make a difference between the signal strengths of the signals at an edge area of high power zone (Zone_H) 410 to be higher than the roaming threshold value. A distance from a center of cell 400 to an edge of high speed service zone (Zone_H) 410 may be set differently according to a service provider or by an access point.

User equipment coupled to AP_H 330 may operate at a comparatively low data transmit rate at an edge area of high speed service zone (Zone_H) 410 although the transmission power of AP_H 330 is set up to be lower than that of AP_L 350. In this case, the user equipment operating at the low data transmit rate may influence other user equipment operating at high data transmit rate in the high speed service zone (Zone_H) 410.

In order to prevent user equipment from operating at a low data transmit rate in high speed service zone (Zone_H), AP_H 330 may set up transmission power for a data frame and a control frame to be higher than that of a management frame in accordance with at least one embodiment of the present invention. Particularly, first power control unit 331 may set up transmission power for the data frame and the control frame to be higher than that of the management frame. Furthermore, AP_H 330 may control the transmission power of the data frame and the control frame to be about identical to the transmission power of AP_L 350 as shown in FIG. 5.

Figure 5:
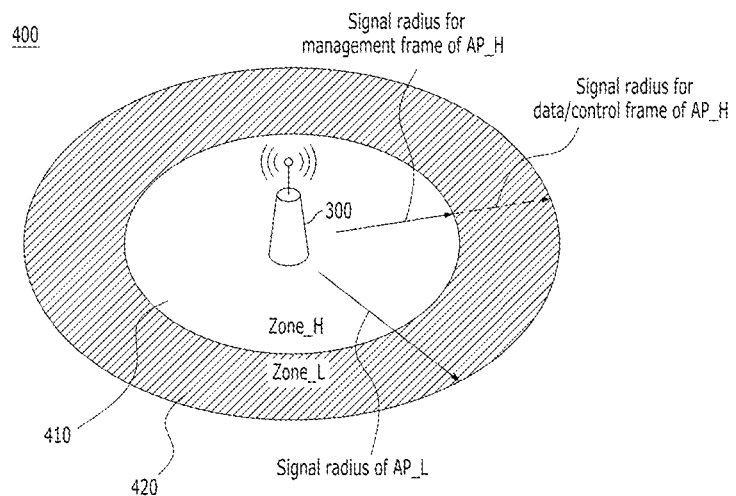
FIG. 5 shows signal radiuses of management frame and data/control frames in accordance with another embodiment of the present invention.

FIG. 5 shows signal radiuses of management frame and data/control frames in accordance with another embodiment of the present invention.

Referring to FIG. 5, AP_H 330 may set up transmission power of the data frame and the control frame to be higher than that of the management frame in accordance with at least one embodiment of the present invention. Furthermore, AP_H 330 may set up transmission of the data frame and the control frame to be lower than that of a management frame transmitted from AP_L 350. Accordingly, a signal radius for the data frame and the control frame is longer than a signal radius for the management frame as show in FIG. 5 although these signals are transmitted from AP_H 330.

The data frame and the control frame may be used for transmitting and receiving data between user equipment and access points or between user equipment and user equipment. The management frame may be used for accessing an access point, for maintaining connection to the access point, and for releasing connection from the access point. A beacon signal may be a representative signal of the management frame. Such beacon signal may be a reference signal for the roaming process.

Through separately controlling the transmission power of the data/control frame and the management frame, user equipment coupled to AP_H 330 may maintain about middle to high data transmit rate at the edge area of the high speed service zone (Zone_H) and roams to AP_L 350 without interruption in accordance with at least one embodiment of the present invention.

Figure 6:
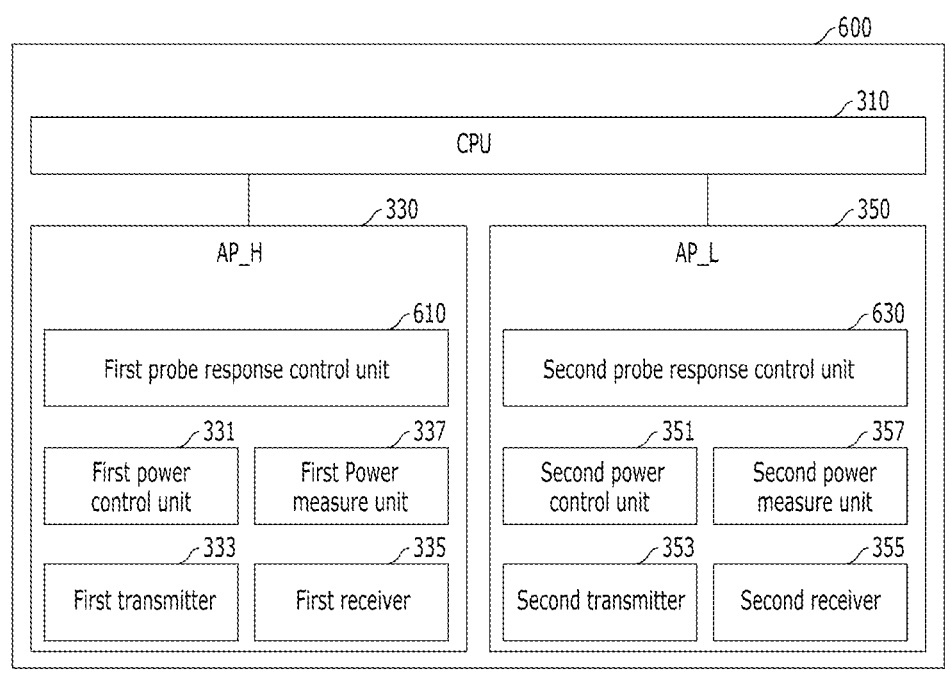
FIG. 6 shows an access point in accordance with at least one embodiment of the present invention.

FIG. 6 shows an access point in accordance with at least one embodiment of the present invention.

Referring to FIG. 6, access point 600 may have similar constituent elements as compared to access point 300 of FIG. 3. Particularly, like numeral reference denote like constituent elements throughout FIG. 3 and FIG. 6. Since like constituent elements such as first and second power control units 331 and 351 and first and second transmitters 333 and 353 were already described with reference to FIG. 3 and FIG. 4, detailed descriptions of like constituent elements will be omitted.

In accordance with at least one embodiment of the present invention, access point 600 may further include first and second probe response control units 610 and 630. Particularly, AP_H 330 may further include first probe response control unit 610 and AP_L 350 may further include second probe response control unit 630.

When access point 600 receives a probe request message from user equipment, first and second probe response control units 610 and 630 may selectively transmit a probe response message to the user equipment according to signal strength of the probe request message.

When transmission power of AP_L 350 is set up to be higher than that of AP_H 330, the transmission power of AP_L 350 is measured higher than the transmission power of AP_H 330 at anywhere in a related cell during a scanning procedure. That is, user equipment might always access AP_L 350 at anywhere in the cell. In order to prevent user equipment from always accessing AP_L 350, access point 600 guides user equipment in high speed service zone (Zone_H) to access AP_H 330 in accordance with at least one embodiment of the present invention. For example, access point 600 may enable user equipment to selectively scan AP_H 330 and AP_L 350 according to a location of user equipment in a related cell.

For enabling user equipment to selectively scan, first probe response control unit 610 may control AP_H 330 to transmit a probe response signal only when signal strength of a received probe request signal is higher than a predetermined threshold. The predetermined threshold may denote signal strength enough for user equipment to operate at a high data transmit rate. Second probe response control unit 630 may control AP_L 350 to transmit a probe response signal only when signal strength of a received probe request signal is lower than the predetermined threshold.

For example, user equipment performs a scanning procedure for scanning access points. In this case, user equipment may broadcast a probe request message. When an access point receives such a probe request message, the access point may determine a location of user equipment based on signal strength of the received probe request message. Particularly, signal strength of a probe request signal transmitted from user equipment located at a center of a related cell device may be higher than the predetermined threshold.

Accordingly, when signal strength of a received probe request signal is higher than the predetermined threshold, first probe response control unit 610 may control AP_H 330 to transmit a probe response signal to corresponding user equipment and second probe response control unit 630 may control AP_L 350 not to transmit a probe response signal to the corresponding user equipment. That is, first and second probe response control units 610 and 620 may guide user equipment located at the high speed service zone to access AP_H 330 in accordance with at least one embodiment of the present invention. Through such selective responding, user equipment recognizes AP_H 330 through the scanning process when the user equipment is located a center of a related cell, which is a high speed service zone of the related cell.

When user equipment is located at an edge area of a related cell which is a low speed service zone, a probe request signal transmitted from the user equipment may have weak signal strength. Accordingly, when signal strength of a received probe request signal is lower than the predetermined threshold, first probe response control unit 610 may control AP_H 330 not to transmit a probe response signal and second probe response control unit 630 may control AP_L 350 to transmit a probe response signal. As a result, such low speed user equipment located at the edge area of the cell may be guided to access AP_L 350. User equipment recognizes AP_L 350 through the scanning process when the user equipment is located the edge area of the related cell, which is the low speed service zone of the related cell.

The operation of first and second probe response control units 610 and 630 was described as being performed during the scanning procedure, but the present invention is not limited thereto. Such operation may be performed during other procedures such as authentication, association, request/response procedures in accordance with some embodiments.

Furthermore, access point 600 is described as including both of first and second probe response control units 610 and 630 in FIG. 6, but the present invention is not limited thereto. In some embodiments, access point 600 may include one of first and second probe response control units 610 and 630. For example, access point 600 may not include first probe response control unit 610 in AP_H 330. Signal strength of a probe response signal transmitted from AP_H 330 is comparatively weak in an edge area of a cell, which is the low speed service zone (Zone_L). Accordingly, most user equipment located in the low speed service zone (Zone_L) access AP_L 350. At a center of a cell, such as a high speed service zone (Zone_H), signal strength of a signal transmitted from AP_L 350 is higher than that of a signal transmitted from AP_H 330. User equipment located at the center of the cell might have a large chance to access AP_L 350 although the user equipment can have a service from AP_H 330 with better service quality. In order to prevent the user equipment located at the center of the cell from accessing AP_L 350, access point 600 may preferably include second probe response control unit 630 in AP_L 350.

Furthermore, AP_H 330 and AP_L 350 are described as including first and second probe response control units 610 and 630 in FIG. 6, but the present invention is not limited thereto. In some embodiments, first and second probe response control units 610 and 630 may be implemented in a MAC layer. Furthermore, AP_H 330 and AP_L 350 can share such MAC layer. In this case, features and functions of first and second probe response control units 610 and 630 may be integrated and implemented as one probe response control unit.

Figure 7:
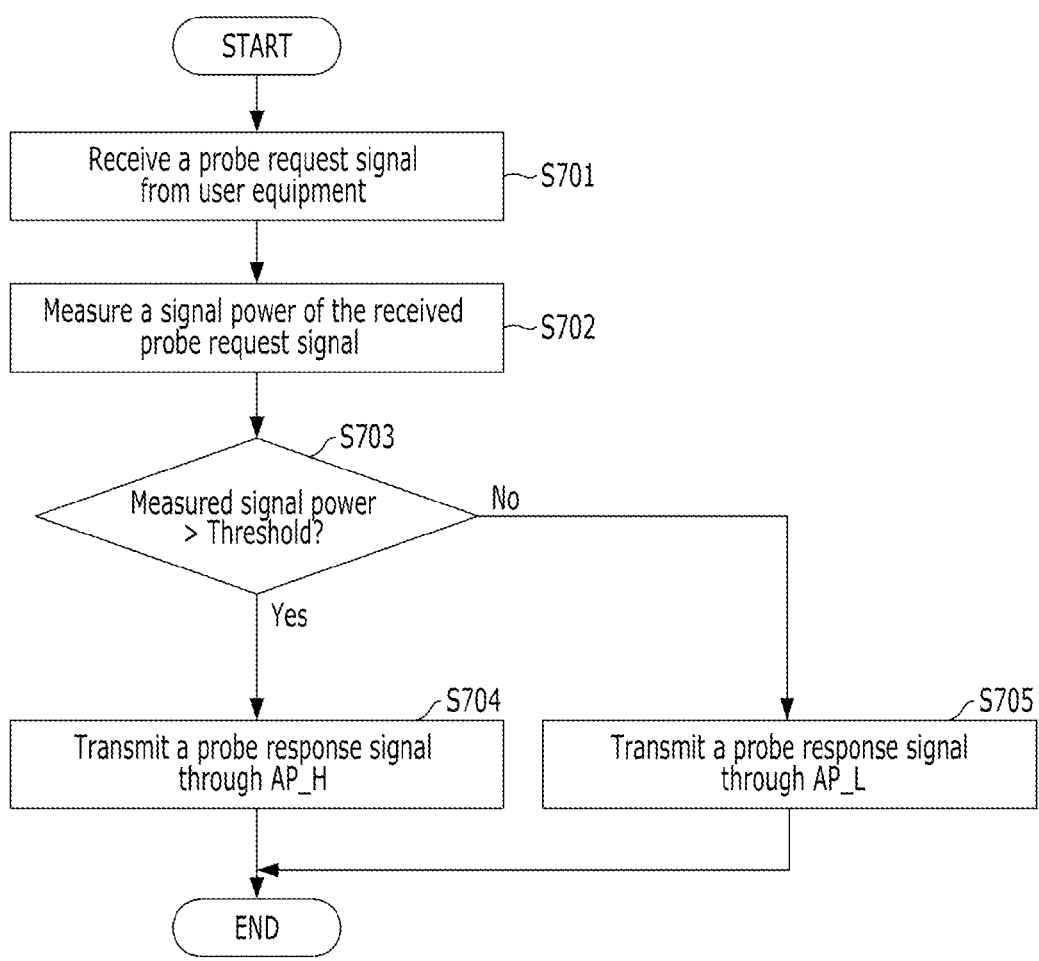
FIG. 7 shows operations of a probe response control unit in accordance with at least one embodiment of the present invention.

FIG. 7 shows operations of a probe response control unit in accordance with at least one embodiment of the present invention.

Referring to FIG. 7, a probe request signal may be received from user equipment at step S701. For example, access point 600 may receive a probe request signal from user equipment located in a related cell. As described, user equipment may broadcast such a probe request signal for scanning access points in a related area.

At step S702, signal strength of the received probe request signal may be measured. For example, upon the receipt of the probe request signal, access point 600 may measure the signal strength of the received probe request signal. Such measurement may be performed through first and second power measure units 337 and 357.

At step S703, determination may be made so as whether the measured signal strength is higher than a predetermined threshold. For example, access point 600 may compare the measured signal strength with the predetermined threshold through first and second probe response control units 610 and 630. The predetermined threshold may be set up differently according to a service provider or according to each access point.

At step S704, a probe response signal may be transmitted to the user equipment when the measured signal strength is higher than the predetermined threshold (Yes—S703). For example, access point 600 may transmit a probe response signal to the user equipment transmitting the probe request signal through AP_H 330 when the signal strength is higher than the predetermined threshold. That is, first probe response control unit 610 may control AP_H 330 to transmit the probe response signal to the user equipment. The user equipment transmitting the probe request signal having the signal strength higher than the predetermined threshold may be user equipment located at a center of a related cell, which is a high speed service zone (Zone_H). Accordingly, access point 600 may transmit the probe response message to such user equipment located in the center of the related cell when the signal strength is higher than the predetermined threshold.

At step S705, a probe response signal may be transmitted to the user equipment when the measured signal strength is lower than the predetermined threshold (No—S703). For example, access point 600 may transmit a probe response signal to the user equipment transmitting the probe request signal through AP_L 350 when the signal strength is lower than the predetermined threshold. That is, second probe response control unit 630 may control AP_L 350 to transmit the probe response signal to the user equipment. The user equipment transmitting the probe request signal having the signal strength lower than the predetermined threshold may be user equipment located at an edge area of a related cell, which is a low speed service zone (Zone_L). Accordingly, access point 600 may transmit the probe response message to such user equipment located in the edge area of the related cell when the signal strength is lower than the predetermined threshold.

Both of AP_H 330 and AP_L 350 were described above as being selectively controlled to respond to a probe request signal from user equipment according to the signal strength of the probe request signal. The present invention, however, is not limited thereto. In some embodiments, access point 600 may control AP_H 330 to always transmit a probe response signal upon the receipt of a probe request signal and control AP_L 350 to selectively transmit a probe response signal according to the signal strength of the probe request signal. Since the signal strength of a signal transmitted from AP_H 330 to user equipment located at a cell edge area (Zone L) is weak, user equipment located at the cell edge area (Zone_L) has a higher chance of accessing AP_L 350. Accordingly, it may be only necessary to restrict user equipment located at the cell center area (Zone_H) from accessing AP_L 350.

Figure 8:
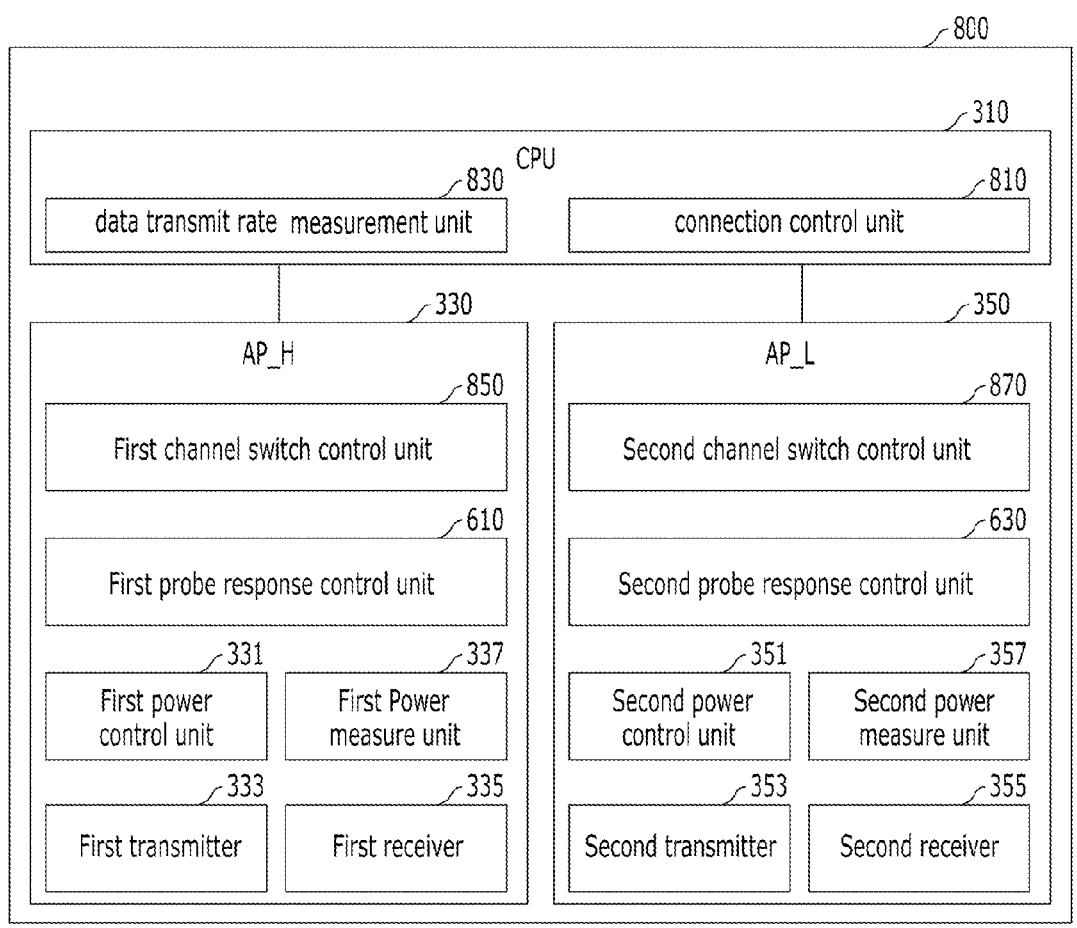
FIG. 8 shows an access point in accordance with another embodiment of the present invention.

FIG. 8 shows an access point in accordance with another embodiment of the present invention.

Referring to FIG. 8, access point 800 may have similar constituent elements as compared to access point 600 of FIG. 6. Particularly, like numeral reference denote like constituent elements throughout FIG. 6 and FIG. 8. Since like constituent elements such as first and second prober response control units 610 and 630, first and second power control units 331 and 351 and first and second transmitters 333 and 353 were already described with reference to FIG. 3, FIG. 6 and FIG. 7, detailed descriptions of like constituent elements will be omitted As shown in FIG. 8, access point 800 may further include connection control unit 830, data transmit rate measurement unit 810, and first and second channel switch frame control units 850 and 870. Particularly, CPU 310 may include connection control unit 830 and data transmit rate measurement unit 810. AP_H 330 may include first channel switch frame control unit 850 and AP_L 350 may include second channel switch frame control unit 870 in accordance with at least one embodiment of the present invention.

A data transmit rate of user equipment may be changed according to interference signals as well as signal strength while user equipment is provided with a service through an access point. For precisely controlling connection to an access point, it may be necessary to consider the data transmit rate of user equipment.

Data transmit rate measurement unit 810 may measure a data transmit rate of user equipment currently connected to access point 800 and provide the measured data transmit rate to connection control unit 830.

Connection control unit 830 may switch connection of the user equipment between AP_H 330 and AP_L 350 according to the measured data transmit rate of the user equipment. For example, connection control unit 830 may control first channel switch frame control unit 850 of AP_H 330 to switch connection of user equipment from AP_H 330 to AP_L 350 when the data transmit rate of the currently connected user equipment is slower than a reference data transmit rate. In order to control, connection control unit 830 may transmit a control command to first channel switch frame control unit 850. Furthermore, connection control unit 830 may control second channel switch frame control unit 870 of AP_L 350 to switch connection of the user equipment from AP_L 350 to AP_H 330 when the data transmit rate of the user equipment is faster than the reference data transmit rate. In order to control, connection control unit 830 may transmit a control command to second channel switch frame control unit 870.

Upon the control command, first and second channel switch frame control units 850 and 870, respectively, may transmit a channel switch command to the user equipment through one of first and second transmitters 333 and 353. As the channel switch command, access point 800 may use a channel switch announcement frame defined in an IEEE 802.11 standard. The present invention, however, is not limited thereto. As the channel switch command, a new frame including a field indicating channel switch may be used in some embodiments.

According to the IEEE 802.11 standard, the channel switch announcement frame is defined for switching one channel to the other that an access point wants to use and for instructing all user equipment to change a current channel to the other after a certain time interval such as a channel switch count. In accordance with at least one embodiment of the present invention, such a channel switch announcement frame may be used to change a channel of AP_H 330 to a channel of AP_L 350 or vice-versa because AP_H 330 and AP_L 350 use different channels. Table 1 below shows a structure of the channel switch announcement frame.

TABLE 1

| Element ID | Length | Channel Switch Mode | New Channel Number | Channel Switch Count |
| --- | --- | --- | --- | --- |

As shown in Table 1, the channel switch announcement frame may include an element ID field, a length field, a channel switch mode, a new channel number, and a channel switch count. The channel switch mode may include information indicating initiation of a channel switch operation. The new channel number may include information on an identification of a target channel to be switched. The channel switch count field may include information on an interval for performing the channel switch operation.

In FIG. 8, AP_H 330 and AP_L 350 were described as respectively including first and second channel switch frame control units 850 and 870, but the present invention is not limited thereto. In some embodiments, such first and second channel switch frame control units 850 and 870 may be implemented in a MAC layer. When AP_H 330 and AP_L 350 share the MAC layer, first and second channel switch frame control units 850 and 870 may be integrated and embodied as one unit. In this case, one channel switch frame control unit may transmit a channel switch command to user equipment through first and second transmitters 333 and 353 in response to the control command from connection control unit 830.

In FIG. 8, connection control unit 830 and data transmit rate measurement unit 810 were described as being included in CPU 310, but the present invention is not limited thereto. In some embodiments, connection control unit 830 and data transmit rate measurement unit 810 may be independently implemented in the MAC layer of AP_H 330 and in the MAC layer of AP_L 350. When AP_H 330 and AP_L 350 share the MAC layer, connection control unit 830 and data transmit rate measurement unit 810 may be integrated and embodied as one unit in the MAC layer.

Figure 9:
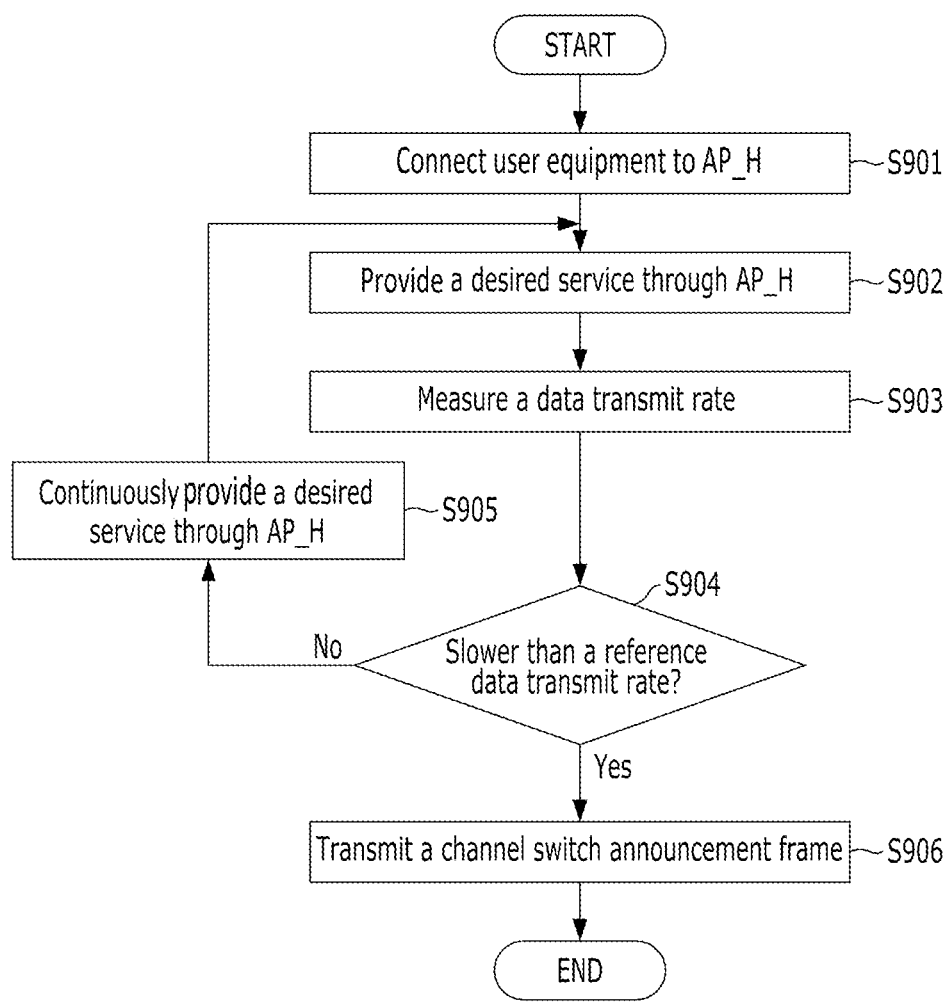
FIG. 9 shows channel switching operation in an access point in accordance with at least one embodiment of the present invention.

FIG. 9 shows channel switching operation in an access point in accordance with at least one embodiment of the present invention.

Referring to FIG. 9, access point 800 may establish connection between AP_H 330 to user equipment at step S901 and provide a service to the user equipment through AP_H 330. For example, when user equipment located at the center cell area (Zone_H) requests connection to access point 800, access point 800 may control AP_H 330 to establish connection to the user equipment. In this case, user equipment may operate at a comparatively high data transmit rate. After the connection is established, a requested service such as an Internet service may be provided to the user equipment through AP_H 330 at step S902.

At step S903, access point 800 may measure a data transmit rate of the user equipment while providing the service. Access point 800 may regularly measure the data transmit rate of the user equipment. Particularly, data transmit rate measurement unit 830 may measure the data transmit rate of the user equipment regularly.

At step S904, access point 800 may determine whether the data transmit rate of the user equipment is slower than a reference data transmit rate. Since user equipment may travel and change location in the cell, a data transmit rate of the user equipment may need to change depending on location in the cell.

When the data transmit rate is not slower than the reference data transmit rate (No—S904), access point 800 may continuously provide the service through AP_H 330 at step S905. However, when the data transmit is slower than the reference data transmit rate (Yes—S904), access point 800 may transmit a channel switch command to the user equipment in order to switch a channel of user equipment from AP_H 330 to AP_L 350 at step S906. The channel switch command may be a channel switch announcement frame. Access point 800 may include information on a new channel (i.e. a channel of AP_L 350) in a new channel number field of the channel switch announcement frame and transmit the channel switch announcement frame to the user equipment. The user equipment may indicate initiation of the channel switch operation and identify a channel of AP_L 350 as a target channel to change based on information included in the channel switch announcement frame. The user equipment may disconnect connection of AP_H 330 after a certain time interval is expired. Information on such certain time interval may be included in a channel switch count field in the channel switch announcement frame. After disconnection, the user equipment may establish connection to AP_L 350.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

No claim element herein is to be construed under the provisions of 35 U.S.C. §112, sixth paragraph, unless the element is expressly recited using the phrase "means for" or "step for."

Although embodiments of the present invention have been described herein, it should be understood that the foregoing embodiments and advantages are merely examples and are not to be construed as limiting the present invention or the scope of the claims. Numerous other modifications and embodiments can be devised by those skilled in the art that will fall within the spirit and scope of the principles of this disclosure, and the present teaching can also be readily applied to other types of apparatuses. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An access point for forming multiple service zones within a corresponding cell, the access point comprising;
    a first access point processor configured to form a first service zone for first user equipment located at a center area of the cell; and
    a second access point processor configured to form a second service zone for second user equipment located at an edge area of the cell,
    wherein the first access point processor is configured to set a third transmission power for transmitting a data frame and a control frame to the first user equipment and to set a fourth transmission power for transmitting a management frame to the first user equipment, and the fourth transmission power is lower than the third transmission power.

2. The access point of claim 1, wherein:
    the first access point processor is configured to set a first transmission power for signals transmitted to the first user equipment in order to form the first service zone; and
    the second access point processor is configured to set a second transmission power for signals transmitted to the second user equipment in order to form the second service zone.

3. The access point of claim 2, wherein the first transmission power is lower than the second transmission power.

4. The access point of claim 1, wherein:
    the first access point processor is configured to transmit a probe response signal only to user equipment located in the first service zone in response to a probe request signal from the user equipment.

5. The access point of claim 1, wherein:
    the first access point processor is configured to transmit a probe response signal only to user equipment that transmits a probe request signal having signal strength higher than a predetermined threshold.

6. The access point of claim 1, further comprising:
    a data transmit rate measurement unit configured to measure a data transmit rate of at least one of the first and second user equipment and to compare the measured data transmit rate with a reference data transmit rate; and
    a connection control unit configured to switch connection of the first user equipment from the first access point processor to the second access point processor module when the measured data transmit rate of the first user equipment is slower than the reference data transmit rate, and to switch connection of the second user equipment from the second access point processor to the first access point processor when the measured data transmit rate of the second user equipment is faster than the reference data transmit rate.

7. An access point comprising:
    a first access point processor configured to provide connection to first user equipment located approximate to a center area of an associated cell; and
    a second access point processor configured to provide connection to second user equipment located approximate to an edge area of the associated cell,
    a first probe response control unit configured to control the first access point processor to transmit a probe response signal to the first user equipment only when an associated probe request signal from the first user equipment has signal strength higher than a probe response threshold; and
    a second probe response control unit configured to control the second access point processor to transmit a probe response signal to the second user equipment only when an associated probe request signal from the second user equipment has signal strength lower than the probe response threshold.

8. The access point of claim 7, wherein:
    the first access point processor is configured to set a signal transmission power for transmitting a signal to the first user equipment lower than signal transmission power transmitted by a plurality of other available access points; and
    the second access point processor is configured to set the signal transmission power for transmitting a signal to the second user equipment higher than signal transmission power transmitted by the plurality of other available access points.

9. The access point of claim 8, wherein the signal transmission power for the first user equipment is lower than the signal transmission power for the second user equipment.

10. The access point of claim 8, wherein:
    the first access point processor is configured to set up a signal transmission power for transmission of a data frame and a control frame to be higher than a signal transmission power for transmitting a management frame.

11. The access point of claim 7, further comprising:
    a data transmit rate measurement unit configured to measure a data transmit rate of at least the first and the second user equipment; and
    a connection control unit configured to switch connection of the at least first and second user equipment between the first access point processor and the second access point processor according to the measured data transmit rate of the user equipment.

12. The access point of claim 11, wherein:
    the connection control unit is configured to switch connection of the first user equipment from the first access point processor to the second access point processor when the measured data transmit rate is slower than a reference data transmit rate; and the connection control unit is configured to switch connection of the second user equipment from the second access point processor to the first access point processor when the measured data transmit rate is faster than the reference data transmit rate.

13. The access point of claim 11, wherein the connection control unit is configured to transmit a channel switch announcement frame to at least one of the first and second user equipment to switch the connection.

14. An access point for providing a wireless local area network (WLAN) service, the access point comprising:
a first access point processor configured to transmit a signal of a first wireless channel with a first transmission power; and
a second access point processor configured to transmit a signal of a second wireless channel with a second transmission power lower than the first transmission power, wherein:
the first access point processor is configured to receive a probe request signal from first user equipment in a service area of the access point and transmit a probe response signal to the first user equipment only when signal strength of the received probe request signal from the first user equipment is lower than a predetermined reference signal strength; and
the second access point processor is configured to receive a probe request signal from second user equipment in the service area of the access point and transmit a probe response signal to the second user equipment only when signal strength of the received probe request signal from the second user equipment is higher than the predetermined reference signal strength.

15. The access point of claim 14, wherein:
the second access point processor is configured to transmit a management frame with the second transmission power and transmit a data/control frame with a third transmission power higher than the second transmission power; and
the third transmission power is less than a fourth transmission power.

16. The access point of claim 15, wherein the third transmission power is substantially identical to the first transmission power.

17. The access point of claim 14, wherein:
the first access point processor is configured to transmit a channel switch announcement frame for switching connection of the first user equipment to the second access processor when a data transmit rate of the first user equipment is higher than a reference data transmit rate; and
the second access point processor is configured to transmit a channel switch announcement frame for switching connection of the second user equipment to the first access module when a data transmit rate of the second user equipment is lower than the reference data transmit rate.

* * * * *